United States Patent [19]

Greubel et al.

[11] 4,265,516
[45] May 5, 1981

[54] DISPLAY DEVICE WITH A LIGHT VALVE OPERATED IN A TIME DIVISION MULTIPLEX METHOD

[75] Inventors: Waldemar Greubel; Hans Krueger, both of Munich, Fed. Rep. of Germany

[73] Assignee: Siemens Aktiengesellschaft, Berlin & Munich, Fed. Rep. of Germany

[21] Appl. No.: 14,536

[22] Filed: Feb. 23, 1979

[30] Foreign Application Priority Data

Feb. 27, 1978 [DE] Fed. Rep. of Germany ....... 2808440

[51] Int. Cl.³ .............................................. G02F 1/133
[52] U.S. Cl. .................................... 350/345; 350/337; 350/338; 350/339 D
[58] Field of Search ................... 350/345, 338, 339 D, 350/337

[56] References Cited

U.S. PATENT DOCUMENTS

4,142,781  3/1979  Baur et al. ............................. 350/345

FOREIGN PATENT DOCUMENTS

7724216  12/1977  Fed. Rep. of Germany .

OTHER PUBLICATIONS

Keil "Design Principles of Fluorescence Radiation Converters", *Nuclear Instruments and Methods*, (1970), pp. 111–123.

*Primary Examiner*—Edward S. Bauer
*Attorney, Agent, or Firm*—Hill, Van Santen, Steadman, Chiara & Simpson

[57] ABSTRACT

A display device includes a light valve that is operated in a time division multiplex method and a fluorescent plate. The light valve may be a liquid crystal with a steep gradient of the contrast-voltage curve so that more multiplex steps are possible. One method of increasing this gradient is to allow only light from a narrow defined spatial angle range to pass through the light valve. In order to produce the narrow light cone that is desired, the invention proposes utilizing a diffusingly reflective layer, which extends parallel to a surface of the fluorescent plate at a finite distance and preferably, the light outlet or exit window of the plate is a surface provided with a dielectric multiple layer which allows the fluorescent light to emerge only in relatively limited spatial angle range. Preferably, these surfaces are the narrow edges of the fluorescent plate.

9 Claims, 2 Drawing Figures

DISPLAY DEVICE WITH A LIGHT VALVE OPERATED IN A TIME DIVISION MULTIPLEX METHOD

BACKGROUND OF THE INVENTION

The present invention is directed to a display device which includes a light valve that is operated in a time division multiplex (TDM) process such as a liquid crystal display and a plate-shaped body containing a material having an index of refraction greater than 1 and fluorescent particles to form a fluorescent plate.

A display utilizing a light valve, which operates in a time division multiplex (TDM) method or process and has a fluorescent body or plate, is disclosed in German Utility Pat. No. 7724216, whose disclosure is incorporated in United States Patent Application Ser. No. 929,496 filed July 31, 1978 which issued on May 27, 1980 as U.S. Pat. No. 4,204,399.

In electro-optical displays in which the transition time between the various optical states are relatively long, for example a liquid crystal display based on a DAP effect or the Schadt-Helfrich effect, the multiplex ratio, which can be achieved, is primarily dependent upon the steepness of the gradient of the contrast-voltage curve in the transition range. For example, see the article in *Journal of Applied Physics*, Vol. 48, No. 4, April 1977, pp. 1426-1431. This gradient can reach values, which facilitate more than 100 multiplex steps; however, since the contrast-voltage characteristic is also sensitive to the direction of the oncoming radiation, this large number of steps can only be achieved when sharply focused light is used.

The previous methods of producing light cones required in highly multiplexable displays was to employ a sharply directed illumination or a suitable projection. Since these require complicated construction, consumed additional power, and in particular, convert a passive display into a quasi-active display having a contrast which is dependent upon the environment, these measures have proven to be particularly unsatisfactory.

If the light valve is combined with a fluorescent plate, which acts as a light trap and is provided with light exit windows, the representation contrast and the image brightness of the light valve can be considerably increased in a purely passive fashion and thus without any consumption of energy. A "fluorescent activated display" (FLAD) of this type is known and is disclosed, for example, in German OS No. 25 54 226, whose disclosure is incorporated in United States Patent Application Ser. No. 747,035 filed on Dec. 2, 1976, which issued on Mar. 6, 1979 as U.S. Pat. No. 4,142,781, and is also disclosed and discussed in an article in *Electronics*, Dec. 8, 1977, pp. 113-116. In an FLAD, the spatial angle range of the light emitted from the fluorescent plate can be constricted through specially shaped outlet or exit windows. Examples of this are disclosed in the above mentioned United States Patent Application Ser. No. 747,035. However, a disadvantage of these window designs is that the light component, which is not output coupled from the window remains in the fluorescent plate and thus, the brightness amplification factor is reduced by the limitation of the light outlet cone.

SUMMARY OF THE INVENTION

The object of the present invention is to provide a multiplexable FLAD type display which is provided with a particularly steep gradient contrast-voltage characteristic and at the same time good optical qualities. This object is realized by providing a display device having a light valve operated in a time division multiplex process, said device comprising a light valve display, a plate-shaped body of a material having an index of refraction greater than 1 and containing fluorescent particles, said body having narrow sides and at least one outlet window, and a reflective layer disposed adjacent at least one surface of said narrow sides at a definite distance to extend parallel thereto and to produce a diffused reflection.

The invention is based upon the observation known per se that more fluorescent light is emitted from a fluorescent plate if its narrow sides are provided with diffused reflectors arranged at a finite distance instead of an optical coupled mirror layer. The higher light yields are due to the fact that on the one hand the reflection factor in diffused reflectors can exceed that in a mirror layer and in addition, light, which hits the diffused reflector, is reflected in particular in the direction of the reflector's normal and thus, the path which the reflected light covers in order to be emitted is shorter with corresponding lower losses than in the case of mirror reflections. This referenc is discussed in an article in *Nuclear Instruments and Methods*, Vol. 87, 1970, pp. 111-123.

In the proposed realization utilized in the present invention, the fact, that a diffused reflector produces a focused back scattering, is additionally used to irradiate a multiplexable light valve with light from a narrow angle range. An estimate indicates that a display device in accordance with the invention permits not only a plurality of multiplex steps but also has optical properties which are not inferior to previously known display devices of the FLAD type or design.

The multiplexability of the proposed display can be further improved by providing the light outlet or exit window of the fluorescent plate with a window which still further constricts the outlet cones of the fluorescent light. This window preferably consists of a dielectric multiple layer, such as has already been discussed in association with FLAD type displays in order to vary the image color such as discussed in German Offenlegungsschrift No. 26 19 368. The dielectric multiple layer results in virtually no impairment to the image brightness of the display. The light, which was not allowed through such a reflector, is reflected and finally reaches the diffused reflector, which will reflect it in a new direction which will have a high degree of probability of passing through the dielectric multiple layer. Thus, a dielectric reflector cooperates with the diffused reflector, which functions as an angle converter, in such a way that the opening angle of the light outlet cone is reduced by focusing with low loss and not, for example, by gating-out with the corresponding high loss.

If the light valve is additionally equipped with a second window formed by a front dielectric layer with the medium of the light valve being a liquid crystal display, then a polarized-free display crystal display on a field effect basis can be achieved.

A further increase in the multiplex ratio is possible if the display device corresponding to the invention is designed with the light valve being a liquid crystal display having two carrier plates and two linear polarizers, the liquid crystal display having means on the carrier plates to orient the molecules of the liquid crystal layer to extend in a direction parallel to the plane of the plates with the directiion of the orientation being twisted through 90° when moving in a direction normal to the plates from one plate to another of the two plates. The polarization direction of the two linear polarizers forms a finite angle of $\beta$ wherein $0<\beta<15°$. Preferably, $\beta$ is in a range of between 5° and 12°. The relationship of this angle between the polarization directions of the two polarizers and the gradient of the contrast-voltage characteristic is investigated and discussed in greater detail in the above mentioned article from the *Journal of Applied Physics*, Vol. 48, 1977, p. 1426.

In a basic design of the invention, the light valve display is arranged in a direction of viewing adjacent a front one of the four narrow sides of the plate-shaped body with the light outlet window of the body being formed in part by said front side of the plate which part is covered by the light valve and is free of a reflective layer. Preferably, the surface of the body, which is adjacent the reflective coating, is a rear narrow side disposed opposite the front side and the narrow sides joining the front and rear sides may either have mirror reflective coatings or relective coatings which produce a diffused reflection.

As mentioned hereinabove, the front side may be provided with a dielectric multiple layer, which may be used alone or in conjunction with another front multiple layer. The light valve may be disposed relative to the front outlet window such as formed by the front side so that a perpendicular to the plane of the light valve forms a finite angle with the direction containing the maximum component of the light emitted by the fluorescent particles. In addition, the front surface of the light valve may be provided with a transparent layer causing a diffused scattering effect and the plate-like body may be covered with a filter which passes only a light of the wavelength for exciting the fluorescent particles of the body with said body and particles being arranged so that the light emerges therefrom at one point in a focused fashion.

DESCRIPTION OF THE PREFERRED EMBODIMENTS

Figure 1:
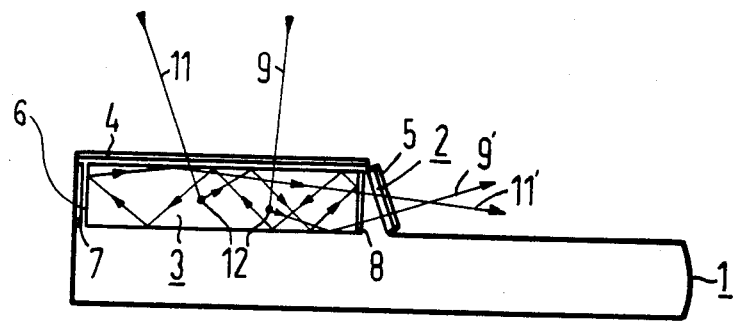
FIG. 1 is a schematic cross section of a pocket calculator utilizing a display device in accordance with the present invention.

The principles of the present invention are particularly useful as a display device for a unit such as a pocket calculator 1 of FIG. 1. The display device includes a liquid crystal display 2 and a fluorescent plate 3. It should be noted that the parts which are not essential for understanding the improved display device of the present invention are not illustrated, such as the keyboard for the pocket calculator and the terminals for applying the fields to the liquid crystal cell of the liquid crystal display 2.

The fluorescent plate is positioned in the housing of the calculator 1, which housing above the plate is provided with the filter 4, which covers a large area surface of the plate 3. The filter 4 will only allow light of the wavelength which is indicated by rays 9 and 11 and excites the fluorescent particles 12 of the fluorescent plate or body 3 to pass therethrough. The liquid crystal display 2 is coated on its front surface with a transparent film 5, which has a diffused scattering effect. The representation on the liquid crystal display 2 is accomplished by use of an X-Y matrix which enables the display of letter sequences or multiple digit numbers and is addressed in a time division multiplex (TDM) process or method. In the present case, the liquid crystal operates on the basis of a DAP effect.

As can be seen in FIG. 1, the liquid crystal display 2 is inclined toward a plane of a narrow edge of the fluorescent plate at an angle. The angle of inclination of the display 2 to an edge of the plate 3 has been selected to be such that the molecules of the liquid crystal, which molecules in a DAP liquid crystal display are homeotropically tilted in a rest state, lie substantially parallel to the main outlet directions of the fluorescent light from the plate 3 which directions are indicated by rays 9' and 11'. Under this condition, the flank or sides of the contrast-voltage characteristic curve is the steepest insomuch as the curve is dependent on the angle of incidence of the light.

On its narrow side 6 facing away from the light crystal display 2, which side 6 will be referred to as a rear side or edge, the fluorescent plate 3 is provided with a diffused reflecting layer 7 and on its front side or edge which is adjacent the cell 2 is provided with a dielectric multiple layer 8. The two other narrow sides of the plate 3, which sides extend between the front side and the rear side 6, are provided with either a diffused reflective layer or with mirror reflectors. The diffused reflective layer expediently consists of $TiO_2$ and is not in an optical contact with side 6 of the fluorescent plate. The decoupling of this type or kind exists simply by applying the reflective layer 7 to a different substrate, for example, a wall of the housing of the calculator 1 and then pressing the side 6 of the fluorescent plate 3 against the reflective layer. In this manner, the only situation in which the above described finite distance between the diffusing reflecting layer and the side 6 of the fluorescent plate is not ensured is when the reflecting layer is directly applied to the side 6 of the plate. Thus, the diffused layer 7 extends parallel to the rear side 6 of the plate at a finite distance.

The angular distribution of the light, which is scattered into the medium by a diffused reflector that is optically decoupled from the medium or plate, is governed by the following equation which is derived from Lambert's Law:

$$I = \sqrt{1 - n^2 \cdot \sin^2 \alpha}$$

wherein $I$ = a component of the diffused reflected light relative to the intensity when $\alpha = 0$, $\alpha$ = the angle of the light with the reflector normal, and $n$ = the index of refraction of the medium. The equation indicates that the cone of scattering becomes increasingly narrower with an increasing value of n. In this respect, it should be pointed out that a reflector can also be designed in such a way that it can have a marked directional characteristic than the distribution described by Lambert's Law. Reflectors of this kind are commercially available.

Figure 2:
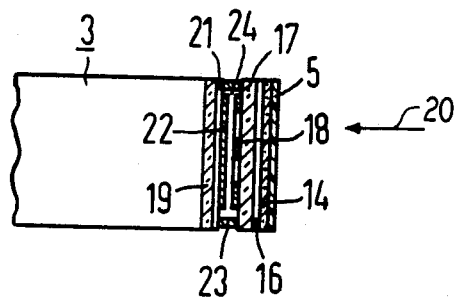
FIG. 2 is a partial cross-sectional view of an embodiment of the display of the present invention.

The fundamental difference between the exemplary embodiment illustrated in FIG. 2 and the previously described design consists in the position and construction of the liquid crystal display. The liquid crystal cell is positioned on a front side of the fluorescent plate in an untilted manner when taken from the direction of viewing indicated by arrow 20. It contains in detail a transparent layer 5, which has a diffused scattering effect, a transparent plate 14, a front dielectric multiple layer 16, a front carrier plate 17, which is provided with a segmented conductive layer such as electrode segments 18. A rear carrier plate 19 which has a continuous conductive layer or rear electrode 22 is also provided with a dielectric multiple layer 21. The two carrier plates 17 and 19 are connected to one another at a given distance by a frame 23 and the chamber 24 defined by the frame and the two carrier plates is filled with a liquid crystal layer.

Together with the rear electrode 22 and the liquid crystal layer in the chamber 24, the rear multiple layer 21 forms one single dielectric multiple layer. This multiple layer is adapted to the fluorescent plate in such a way that in the rest state of the liquid crystal layer, it allows a fluorescent light to pass only in a narrow light cone, a so-called central cone, which is centered about a perpendicular to the plate front surface. The front multiple layer 16, which is optically decoupled from the rear multiple layer by a relatively thick carrier plate 17, is constructed in such a way that it only is permeable to the fluorescent light from the central cone.

If the liquid crystal layer is operated in a specific range, it changes its index of refraction and consequently, the transmission characteristics of the rear multiple layer in such a way that the fluorescent light no longer passes through the central cone. It is either reflected or passes the multiple layer in a hollow cone, whose smaller boundary angle is greater than the opening angle of the central cone. As the front multiple layer 16 is impermeable to the fluorescent light from directions of this kind, the following representation will occur. Outside of the display zone and in the non-operated or non-energized display zones, the display screen appears in a color which is determined by the reflection of the surrounding light on the multiple layer and by fluorescent light emanating from the fluorescent plate. The fluorescent light component is absent in the operated or energized display zones. An image is formed in a color which is complementary to the fluorescent color. A preceeding color filter allows a further increase in contrast. The light valve illustrated in FIG. 2 can also possess or be operated in a complementary manner so that while in the rest state, the overall arrangement allows the passage of no fluorescent light but in an activated or energized zone is permeable to the fluorescent light.

The invention is not limited to the illustrated embodiments. Thus, it is also possible to use other light valves in which the multiplexability is dependent upon the gradient of the contrast-voltage characteristic and this characteristic in turn varies with the angle of incidence of light. In particular, other field effect liquid crystal displays such as, for example, a so-called twisted nematic cell can be used.

There is also a considerable amount of variations with respect to the structure. For example, the same effect is achieved if the light valve is positioned in front of one of the two large area surfaces of the plate instead of in front of one of the narrow sides of the plate. Under these circumstances, it is likewise expedient to provide the surface area located opposite the outlet window with the dielectric reflector. Moreover, the fluorescent plate may not necessarily have a strict parallellepiped shape and modifications of rectangular basic forms or bends in the plate are also conceivable. If the fluorescent plate is covered with a high-pass filter, this filter could simultaneously serve to charge a battery for collecting solar energy utilizing a photo receiver in order to possibly feed a light source for the light valve or the electronics of a pocket calculator. For this purpose, the filter should be designed in such a way so that the fluorescent plate is in the form of a light trap and thus should be provided with fluorescent substances and designed in such a way that it conducts its fluorescent radiation to a photo receiver. The fluorescent substance should be selected to be such that it itself produces or at least does not impair the filter effect.

Although various minor modifications may be suggested by those versed in the art, it should be understood that we wish to embody within the scope of the patent granted hereon, all such modifications as reasonably and properly come within the scope of our contribution to the art.

We claim:

1. A display device comprising a light valve display operated in a time division multiplex process, a plate-shaped body of a material having an index of refraction greater than 1 and containing fluorescent particles, said body having narrow sides, one of said sides forming an outlet window through which fluorescent light passes from said body to said light valve display, a diffusely reflective layer spaced from the opposite side of said body from said outlet window for producing focussed backscattering of fluorescent light so that the fluorescent light which is emitted through said outlet window to said light valve display is emitted over a narrow angular range, and a dielectric multiple layer adjacent said one side for further constricting the angular range of the emitted fluorescent light.

2. A display device according to claim 1, wherein the light valve display display is arranged in the direction of viewing adjacent a front one of the narrow sides of the plate-shaped body, said light outlet window of the body being formed in part by said front narrow side of the plate which part is covered by the light valve display and is free of a reflective layer.

3. A display device according to claim 2, wherein the one narrow side of the body being adjacent the reflective layer is a rear narrow side of the body disposed directly opposite said front side.

4. A display device according to claim 3, wherein the other narrow sides of the body extending between the front and rear sides are provided with a layer which produces a reflective coating which produces a diffused reflection.

5. A display device according to claim 1, wherein said dielectric multiple layer is disposed on a surface of the front side of the body when considered in the direction of observation, a switchable medium of the light valve display being arranged adjacent to and in front of said dielectric multiple layer.

6. A display device according to claim 5, wherein a colored filter, which is primarily permeable only to the fluorescent light, is disposed in front of the front dielectric multiple layer.

7. A display device according to claim 1, wherein the light valve display is a liquid crystal display having a liquid crystal layer disposed between two carrier plates and two linear polarizers, said liquid crystal display having means on the carrier plates to orient the molecules of the liquid crystal layer to extend parallel to the direction of the plane of the plates with the direction of orientation being twisted through 90° when moving in a direction normal to the plate from the one to the other of said plates, the polarization direction of the two linear polarizers forming a finite angle of $\beta$, wherein $0 < \beta < 15°$.

8. A display device according to claim 7, wherein $\beta$ is in a range between 5° and 12°.

9. A display device according to claim 1, wherein a front surface of the light valve display when taken in a direction of viewing is provided with a transparent layer causing a diffused scattering effect.

* * * * *